US012242649B2

United States Patent
Marudi et al.

(10) Patent No.: US 12,242,649 B2
(45) Date of Patent: Mar. 4, 2025

(54) SUPER-COOKIE IDENTIFICATION FOR STOLEN COOKIE DETECTION

(71) Applicant: PAYPAL, INC., San Jose, CA (US)

(72) Inventors: Matan Marudi, Or Yehuda (IL); Yuval Bercovich, Givatayim (IL); Yarden Raiskin, Petaá-Tiqwa (IL)

(73) Assignee: PAYPAL, INC., San Jose, CA (US)

( * ) Notice: Subject to any disclaimer, the term of this patent is extended or adjusted under 35 U.S.C. 154(b) by 392 days.

(21) Appl. No.: 17/816,111

(22) Filed: Jul. 29, 2022

(65) Prior Publication Data
US 2024/0037279 A1 Feb. 1, 2024

(51) Int. Cl.
G06F 21/62 (2013.01)
G06F 21/60 (2013.01)
H04L 9/40 (2022.01)

(52) U.S. Cl.
CPC ........ *G06F 21/6263* (2013.01); *G06F 21/602* (2013.01); *H04L 63/0876* (2013.01); *H04L 63/1416* (2013.01)

(58) Field of Classification Search
CPC .... G06F 21/6263; G06F 21/602; G06F 21/60; G06F 21/62; H04L 63/0876; H04L 63/1416
See application file for complete search history.

(56) References Cited

U.S. PATENT DOCUMENTS

| 2006/0036875 A1* | 2/2006 | Karoubi | H04L 63/168 |
| | | | 713/193 |
| 2008/0034425 A1* | 2/2008 | Overcash | G06F 21/55 |
| | | | 726/22 |
| 2017/0053028 A1* | 2/2017 | Lau | G06F 21/53 |
| 2020/0153809 A1* | 5/2020 | Marzorati | H04L 9/0643 |
| 2022/0035952 A1* | 2/2022 | Brannon | G06F 3/0482 |

* cited by examiner

*Primary Examiner* — Kaveh Abrishamkar
*Assistant Examiner* — Howard H. Louie
(74) *Attorney, Agent, or Firm* — Haynes and Boone, LLP

(57) ABSTRACT

Methods and systems are presented for stolen cookie detection. An authentication request is received for a user to access a website using a web browser executable at the user's device. A series of storage locations available on the device for storing web cookies is identified and sorted in order of increasing fraud risk starting from a first storage location. A cookie value for each storage location is retrieved from the device. For each storage location after the first: an expected cookie value is calculated based on the cookie value of a preceding storage location; the expected cookie value is compared with the value retrieved for the storage location; and a score representing a level of fraud risk for the storage location is assigned. The authentication request is processed based on whether the assigned score for at least one of the storage locations exceeds a predetermined risk tolerance for fraud detection.

20 Claims, 7 Drawing Sheets

SUPER-COOKIE IDENTIFICATION FOR STOLEN COOKIE DETECTION

TECHNICAL FIELD

The present specification generally relates to authentication mechanisms for user account login based on web cookies, and particularly to cookie-based authentication mechanisms for fraud detection during subsequent login attempts.

BACKGROUND

A service provider may provide different computing resources and services to users through different websites, resident applications (e.g., which may reside locally on a computing device), and/or other online platforms. When utilizing the services of a particular service provider, a server associated with the service provider may store one or more HyperText Transfer Protocol (HTTP) cookies (also referred to as "web cookies" or simply, "cookies") on the user's device. A cookie generally is a small block of data created by a web server while a user is browsing a website and placed on the user's computer or other device by the user's web browser. Cookies may include, for example, data strings, tokenized data, or other types of data, which may be used to identify a particular user and/or user device. In some cases, the cookie stored on a user's device may serve as a device fingerprint (e.g., based on device identifiers, operating system data or identifiers, applications, and the like), or other data that uniquely identifies the user's device. Such cookies are usually placed on the device used to access a website, and more than one cookie may be placed on a user's device during a session. The same cookies are then provided to the service provider to authenticate the user and login to the user's account during a subsequent session. This provides a more convenient option for subsequent authentication and login to a user's account with a service provider. However, such cookies also raise security risks. For example, the theft of cookies is a sophisticated form of cyberattack, where an attacker steals or copies cookies from a victim's computer onto the attacker's web browser. With stolen cookies, often containing hashed passwords, the attacker can use a web browser on the attacker's computer to impersonate the user (or authenticated device thereof) and gain access to secure information associated with the user's account without having to manually login or provide authentication credentials.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
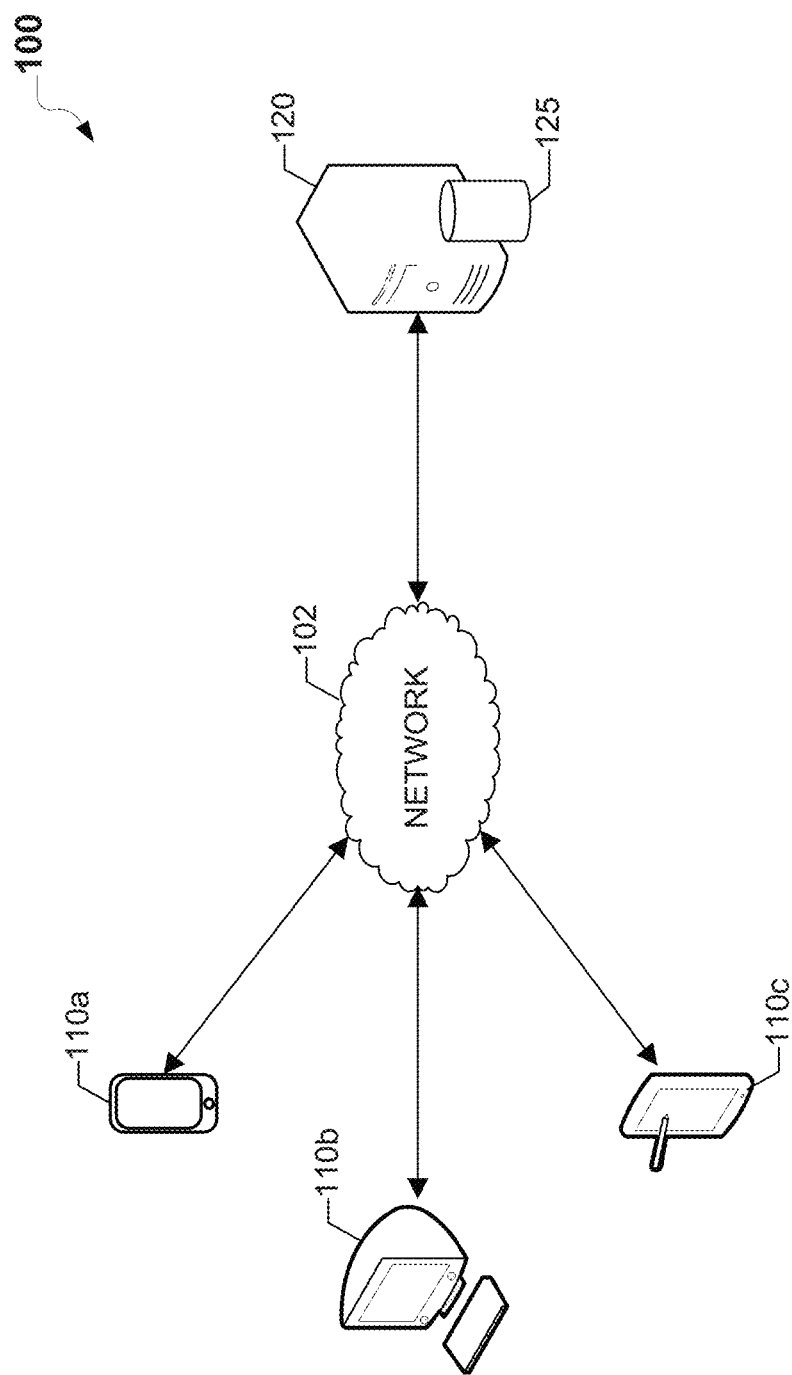
FIG. 1 is a block diagram of a distributed network communication system according to an embodiment of the present disclosure.

Embodiments of the present disclosure relate to super-cookie identification and verification for user authentication and fraud detection. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure utilize super-cookie identification on a user's device to detect potential fraud during user authentication and login attempts between multiple sessions or visits to the same website. For example, a user may attempt to access secure information on a website by visiting the website using a web browser executable at the user's device. When the user visits the website, an authentication request for the user to access the website may be received by a web server hosting the website. The authentication request may include, for example, login credentials for a user account associated with the website. In some embodiments, the website may be hosted by a web server of a service provider for providing one or more web services. The service provider may be, for example, an online transaction processor that provides electronic transaction processing services, including account services, user authentication and verification, digital payments, risk analysis and compliance, and the like. The service provider in this example may store web cookies at multiple storage locations on the user's device to reduce the risk of fraud or other misappropriation of data for subsequent login attempts and user sessions with the web service. The web cookies may include values (e.g., super-cookie values) that correspond to unique device identifiers or fingerprints that the service provider can use to track device activity across multiple user sessions.

Unlike a traditional super-cookie (or "evercookie") scheme, in which intentionally deleted web cookies are identified and reproduced at multiple cookie storage locations on a user's device, the disclosed super-cookie identification techniques use sequential encryption to modify and link cookie values between the different storage locations according to their respective levels of fraud risk. In some embodiments, a series of storage locations that are available on the device for storing web cookies may be identified and sorted in order of increasing fraud risk. The level of fraud risk associated with each storage location may be representative of how vulnerable the web cookie at that storage location is to being compromised or stolen relative to other cookie storage locations on the device. The level of fraud risk may also represent the relative ease or difficulty of access to web cookies stored at that location and therefore, the likelihood that an attacker may steal the stored cookies. A weight representing the level of fraud risk (or riskiness score) may be assigned to each storage location based on the position of that location in the series.

Furthermore, embodiments of the present disclosure may leverage the super-cookie storage framework along with sequential encryption to distinguish between new visitors, recurring visitors, and visitors with stolen cookies. The disclosed techniques may be used to check for recurring visitors by checking their super-cookie values across the available storage locations and comparing the present values with the expected values. The expected values may be derived using sequential encryption, as will be described in further detail below. In some embodiments, a private encryption key, e.g., associated with the service provider in the above example, may be generated and used to encrypt all cookie values for all visitors to the website. In some implementations, an asymmetric key encryption system, e.g., RSA, may be used for the encryption to make it more difficult for possible attackers to reverse-engineer the encryption technique and nullify the encryption process by replicating the private key on their machine. However, it should be appreciated that embodiments are not limited thereto and that any of various encryption techniques may be used as desired for a particular implementation.

FIG. 1 is a block diagram of a distributed network communication system 100 according to an embodiment of the present disclosure. As shown in FIG. 1, system 100 includes various client devices 110a, 110b, and 110c (collectively referred to herein as "client devices 110a-c"), which are communicatively coupled to a remote server 120 via a network 102. Each of client devices 110a-c may be any type of computing device having at least one processor and a memory in the form of a computer-readable storage medium for storing data and instructions that can be read and executed by the processor. Such a computing device may also include an input interface for receiving user input or commands via a user input device (e.g., a mouse, QWERTY or T9 keyboard, touch-screen, or microphone). The computing device may also include an output interface for outputting or presenting information via a display coupled to or integrated with the device. In some implementations, the input and output interface may be combined into a single input/output (I/O) interface. Examples of such a computing device include, but are not limited to, a desktop computer (e.g., client device 110b), a laptop computer, a smartphone (e.g., client device 110a), a tablet (e.g., client device 110c), a personal digital assistant (PDA), and any other fixed or mobile data processing device. Server 120 may be any type of computing device, e.g., a web server or application server, capable of serving data to each of client devices 110a-c and other computing devices (not shown) over network 102.

Network 102 may be any network or combination of networks that can carry data communication. Such network can include, but is not limited to, a wired (e.g., Ethernet) or a wireless (e.g., Wi-Fi and 3G) network. In addition, network 102 may include, but is not limited to, a local area network, medium area network, and/or wide area network, such as the Internet. Network 102 may support any of various networking protocols and technologies including, but not limited to, Internet or World Wide Web protocols and/or services. Intermediate network routers, gateways, or servers may be provided between components of system 100 depending upon a particular application or environment.

In some embodiments, each of client devices 110a-c executes a client application, e.g., a web browser, for accessing a website hosted by server 120. Web content, e.g., one or more web pages, associated with website may be retrieved by the client application over network 102 using one or more communication protocols, for example, HyperText Transfer Protocol (HTTP). The website content may be displayed in a content area of the client application. A user may interact with the displayed content at one or more of the client devices 110a-c to perform various tasks associated with a web service executed by server 120. For example, client devices 110a-c may be different devices of the same user, which the user may use to visit the website at various times or locations. If the user is a first-time visitor to the website, the displayed content at each client device may include a login form with fields for the user to enter login credentials, e.g., username and password, for logging into an account with a service provider associated with server 120. Server 120 may check the login credentials, as input by the user and received over network 102, against user account information stored in a database 125 to authenticate the user before providing access to features of one or more web services executed by server 120. Database 125 may be any type of data store or recordable storage medium configured to maintain, store, retrieve, and update information for server 120. In some embodiments, server 120 may also execute a web cookie verification service for stolen cookie detection, as will be described in further detail below.

Figure 2:
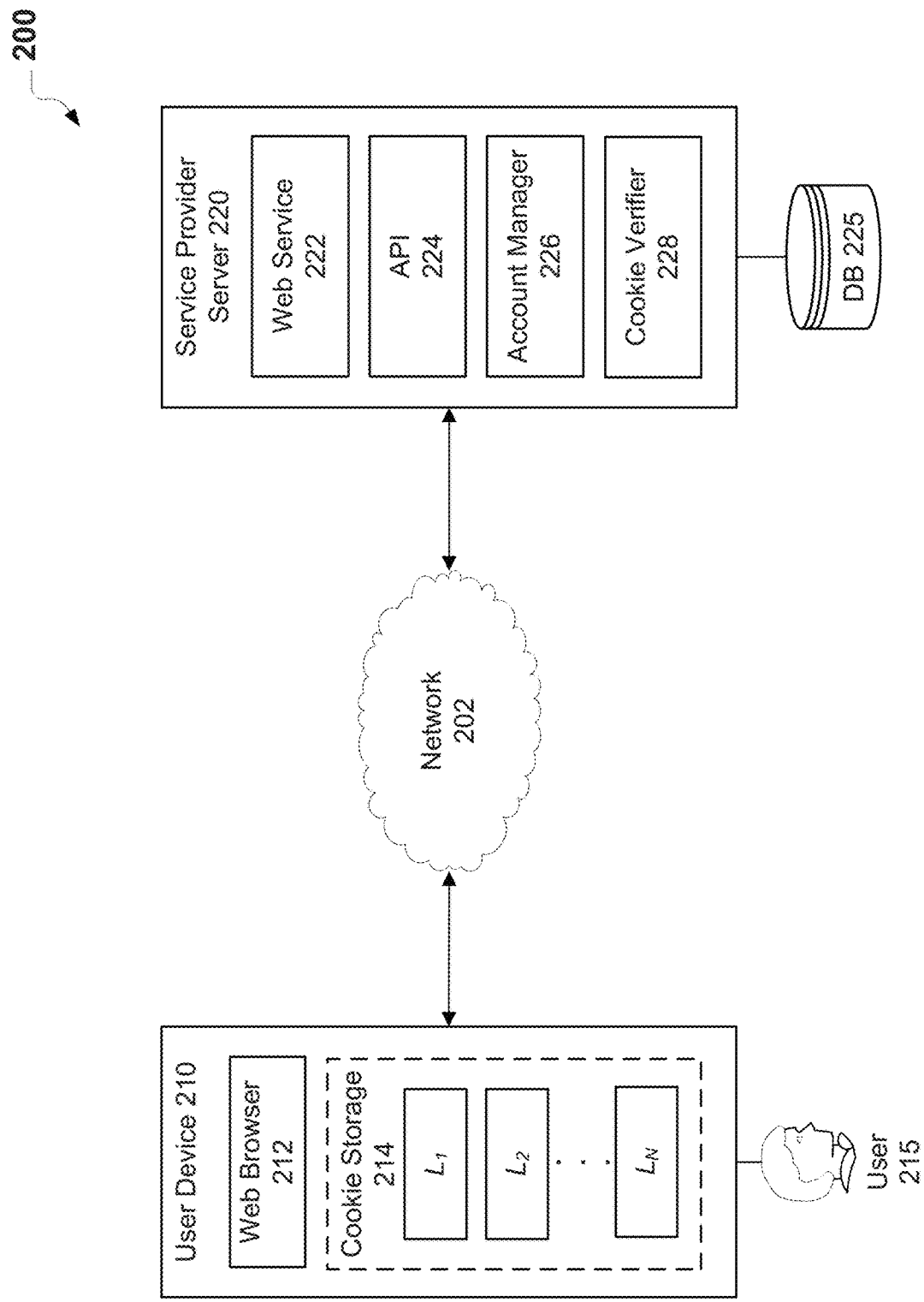
FIG. 2 is a block diagram of a communication system for web cookie verification, according to an embodiment of the present disclosure.

FIG. 2 is a block diagram of a communication system 200 for web cookie verification, according to an embodiment of the present disclosure. For discussion purposes, system 200 will be described using system 100 of FIG. 1, as described above, but system 200 is not intended to be limited thereto. As shown in FIG. 2, system 200 includes a user device 210 and a service provider server 220. User device 210 may be implemented using, for example, any one of client devices 110a-c of FIG. 1, as described above. Likewise, server 220 may be implemented using, for example, server 120 of FIG. 1, as described above. User device 210 may be communicatively coupled to server 220 via a network 202. Network 202 may be implemented using, for example, network 102 of FIG. 1, as described above.

User device 210 executes a web browser 212 that a user 215 of device 210 may use to access a website via network 202. The website may be hosted by, for example, service provider server 220. The location of the website may be identified by a Uniform Resource Identifier (URI) or Uniform Resource Locator (URL), e.g., a web address or Internet Protocol (IP) address. Web browser 212 may retrieve website content associated with the URL from server 220 via network 202. User 215 may use a user input device (e.g., a mouse or keyboard) to interact with web browser 212, including any website content loaded therein, to initiate or perform various tasks, for example, directing web browser 212 to different web pages of the same website or to pages of other websites hosted by other servers (not shown). User 215 may also enter information and data into web browser 212 (or web page displayed therein) for transmission over network 202.

In some embodiments, the website may be associated with a web service 222 provided by service provider server 220. Web service may be any type of web service or web application, as described above. User 215 may access the functionality provided by web service 222 using web browser 212 over network 202. Web browser 212 may use one or more communication protocols including, but not limited to, HTTP, to send and receive information to and from web service 222 and server 220 via network 202.

While not shown in FIG. 2, it should be appreciated that user device 210 may include any of various additional applications as necessary or desired for a particular implementation. Examples of such additional applications include, but are not limited to, security applications for implementing client-side security features, programmatic client applications for interfacing with appropriate application programming interfaces (APIs), e.g., API 224, over network 202, and/or various other types of generally known programs and/or software applications. The features of one or more of these additional applications may be combined with those of web browser 212 for implementing the web content authentication techniques disclosed herein. Likewise, while only web service 222 is shown in FIG. 2 for server 220, it should be appreciated that server 220 may include additional components or provide additional web services or applications as desired for a particular implementation. Such additional services may include cookie verification services for fraud or stolen cookie detection, as will be described in further detail below.

The service provider associated with server 220 may be, for example, a payment service provider and web service 222 may include various payment processing services provided by the service provider to facilitate electronic or online transactions initiated by user 215 via web browser 212. User 215 in this example may initiate such transactions via web pages displayed within web browser 212. Such web pages may correspond to a website hosted by servers 220 for implementing web service 222. In some implementations, user 215 may use web browser 212 to access websites hosted by one or more third-party servers (not shown) via network 202. The third-party servers may be associated with different business entities, e.g., online merchants, who provide their own web services, e.g., in the form of online marketplace applications, via corresponding websites. Examples of such third-party service websites include, but are not limited to, merchant sites, resource information sites, utility sites, real estate management sites, social networking sites, etc., which offer various items for purchase. The entities (e.g., online merchants) associated with the third-party servers may also be associated with the service provider, e.g., as trusted affiliates or business partners of the service provider.

In some implementations, web service 222 (e.g., payment processing service) may coordinate with the third-party web services via network 202 to provide payment processing services for the online transactions initiated by user 215 through the corresponding marketplace websites. For example, user 215 may be redirected from the marketplace or merchant website hosted by a third-party server to a login page hosted by service provider server 220 as part of web service 222. The login page may be displayed within web browser 212 for enabling user 215 to log into an account of user 215 with the service provider. Once logged in, user 215 may utilize the payment processing features of web service 222, e.g., via a graphical user interface (GUI) of web browser 212 to complete an online payment transaction for purchasing an item from a particular marketplace/merchant website. For example, web service 222 may enable purchase expenses to be directly and/or automatically debited from the corresponding user account via web browser 212.

In some embodiments, service provider server 220 may also include an application programming interface (API) 224 that is configured to serve content (e.g., website content) to users (including user 215) via network 202. For example, API 224 may be used to serve one or more web pages in response to HTTP requests received via network 202 from web browser 212 of user device 210. API 224 may also enable user 215 to interact with web service 222 via a content area or other user interface controls associated with the GUI of web browser 212. It should be appreciated that API 224 may use any of various communication protocols (e.g., RESTAPI, SOAP, etc.) to facilitate such interactions over network 202. In some implementations, web service 222 may include predefined web content ready to be served to users via API 224. The predefined web content may include, for example, a login page that is served to users for logging into respective accounts of the users with the service provider to access various payment processing features of web service 222, as described above. The login page may be served in response to a login request received by service provider server 220 from user device 210 via network 202. Alternatively, the login request may be received by server 220 from a web service of a third-party server in response to an online transaction initiated by user 215 via web browser 212, as described above.

In some implementations, the login request may include a unique identifier that may be used by the service provider server 220 to identify user 215 and an associated user account (or user profile) maintained by the service provider server 220. The unique identifier may be, for example, a unique hardware identifier (e.g., a media control access (MAC) address) or another appropriate device identifier, which may also be used to identify user device 210. Such an identifier may be stored in, for example, an operating system registry entry or web cookies at various cookie storage locations 214 associated with web browser 212 at user device 210, as will be described in further details below.

In some embodiments, an account manager 226 of service provider server 220 may be used to maintain the accounts for users and other entities (e.g., merchants) in a database (e.g., an account database) 225 coupled to server 220. Database (DB) 225 may be any type of data store for storing information accessible to service provider server 220. DB 225 may be implemented using, for example, database 125 of FIG. 1, as described above. In some implementations, each account may be associated with a profile and may include account information associated with one or more individual users (e.g., user 215 associated with device 210) and other entities (e.g., online merchants associated with various third-party web servers). For example, the account information stored in DB 225 may include, but is not limited to, account numbers, login credentials, credit card information, banking information, digital wallets, transaction history, Internet Protocol (IP) addresses, device information, and other private financial information. The stored account information may be used by account manager 226 to match profiles with individual users/entities. In some embodiments, account information also includes user purchase profile information, for example, account funding options and payment options associated with the user, payment information, receipts, and other information collected in response to completed funding and/or payment transactions.

In some implementations, each user may have identity attributes that are stored in association with the account information in DB 225. The identity attributes for each user may include login credentials (e.g., username and password information) to authenticate or verify the user's identity with the service provider server 220. Such user attributes may also include personal information, banking information and/or funding sources. For example, the attributes associated with user 215 may be passed to service provider server 220 (and account manager 226 thereof) as part of a login, search, selection, purchase, and/or payment request. The user attributes in this example may be utilized by account manager 226 to associate user 215 with one or more user accounts maintained by the service provider and later verify the authenticity of any requests received from a device (e.g., user device 210) associated with user 215.

In some embodiments, the identity attributes associated with user 215 may include data for the identification and verification of web cookies stored at user device 210. As described above, server 220 may execute a cookie verification service (or "cookie verifier") 228 to identify a series of storage locations 214 for storing web cookies on user device 210 as part of a super-cookie storage framework. As shown in FIG. 2, such cookie storage locations 214 may include any of various storage locations (e.g., from $L_1$ to $L_N$, where N may be any positive integer as desired for a particular implementation) available on user device 210 for storing web cookies or cookie values associated with web browser 212. While the storage locations are shown in FIG. 2 and described herein as a series of locations, it should be appreciated that such locations may correspond to separate and/or disparate storage areas, e.g., across one or more memory devices, accessible to web browser 212 and server 220 (or cookier verifier 228 thereof) for purposes of cookie verification and stolen cookie detection. Examples of cookie storage locations that may be available on user device 210 include, but are not limited to: a standard HyperText Transfer Protocol (HTTP) cookie storage location; an HTTP Strict Transport Security (HSTS) cookie storage location; a local shared object storage location; a browsing history of web browser 212; an HTTP entity tag (ETag) storage location; an HTTP cache; one or more HyperText Markup Language 5 (HTML5) storage locations; and storage locations associated with Java web frameworks, including the Java Network Launching Protocol (JNLP) Persistence Service. It should be appreciated that the number of available cookie storage locations on a device may be dependent on the particular operating system, type of web browser, and other implementation details related to the web technology employed at the device.

In some embodiments, cookier verifier 228 may use a cookie chain verification process to detect fraud, e.g., compromised, stolen, or otherwise maliciously obtained or copied cookie values within the super-cookie storage framework on the user device 210. It should be appreciated, however, that such a super-cookie storage framework exists on the device only if the user 215 is a recurring visitor of the website. If the user 215 is determined to be a new visitor, cookier verifier 228 may configure the framework by storing appropriate cookie values at available cookie storage locations that are identified on the device, as will be described in further detail below with respect to FIG. 3.

Figure 3:
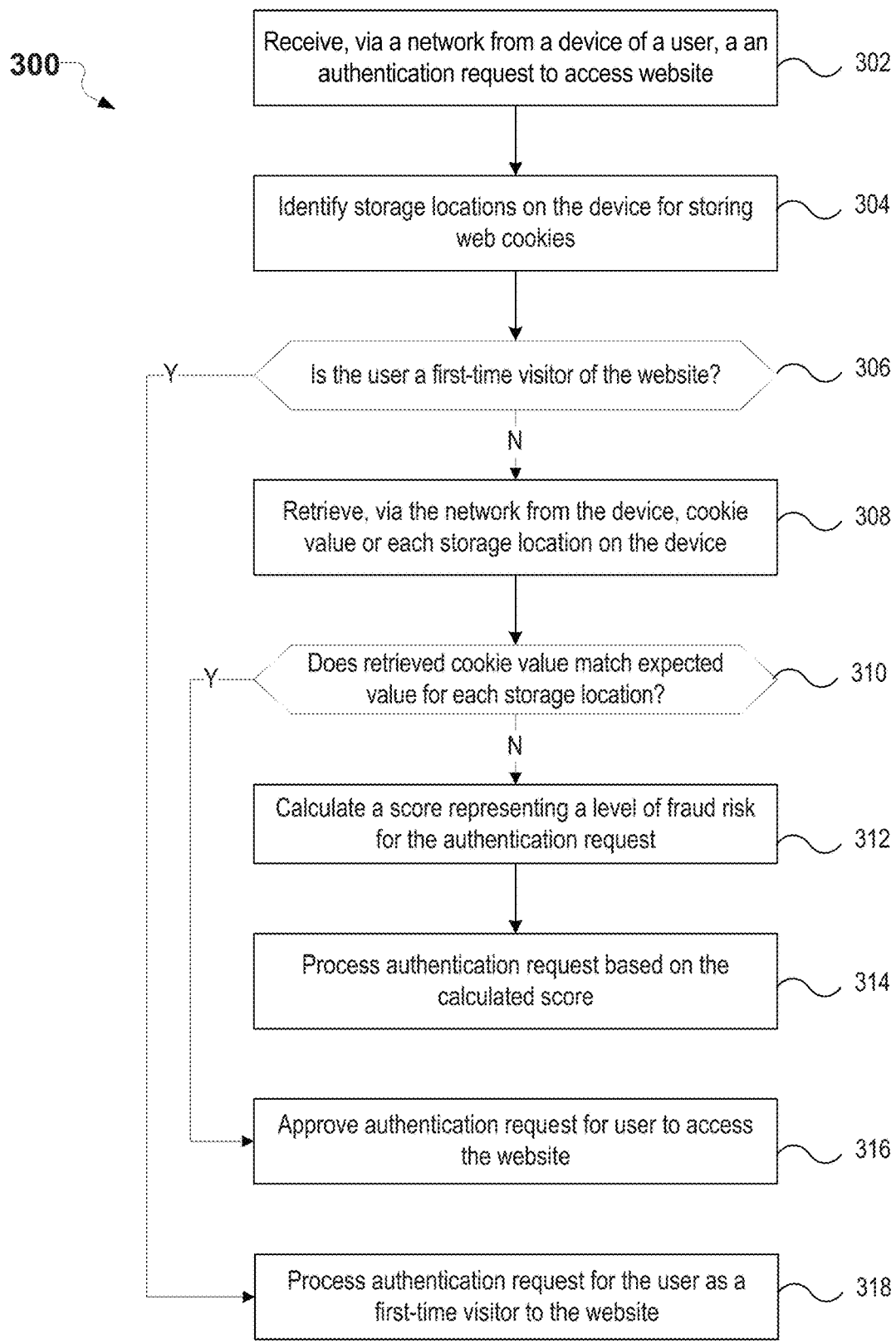
FIG. 3 is a flowchart of a process for web cookie verification to enable user account authentication with fraud detection, according to an embodiment of the present disclosure.

FIG. 3 is a flowchart of a process 300 for web cookie verification to enable user authentication with fraud detection, according to an embodiment of the present disclosure. In some embodiments, process 300 may be performed as part of a transaction risk assessment system of a service provider, e.g., a transaction processing service provider, as described above. For discussion purposes, process 300 will be described using system 200 of FIG. 2, as described above, but process 300 is not intended to be limited thereto. For example, process 300 may be performed by cookie verifier 228 of service provider server 220 of FIG. 2, as described above.

As shown in FIG. 3, process 300 begins in block 302, which includes receiving, via a network from a device of a user, an authentication request for the user to access a website using a web browser executable at the device. In response to the received authentication request, process 300 may proceed to block 304, which includes identifying a series of storage locations available on the device (e.g., cookie storage locations 214 on user device 210 of FIG. 2, as described above) for storing web cookies. Once the available storage locations are identified, process 300 may proceed to block 306.

Block 306 may include, for example, determining whether the user is a first-time visitor of the website. It may be determined that the user is a first-time visitor when there is no web cookie stored at the first storage location. The existence of a web cookie at the first storage location on the other hand may indicate that the user is, for example, a recurring visitor of the website or a visitor with stolen cookies to impersonate the recurring visitor. If it is determined in block 306 that the user is not a first-time visitor (i.e., when a web cookie value is stored at the first storage location), process 300 proceeds to block 308, in which a cookie value is retrieved from the user's device for each storage location in the series of storage locations. If the web cookie or cookie value is missing from any storage location after the first location in the series, the cookie value for that storage location is set to a null value.

Process 300 then proceeds to block 310, which includes determining whether the retrieved cookie value for each storage location matches an expected cookie value for that storage location. Block 310 may include first calculating an expected cookie value for each storage location after the first storage location in the series of storage locations, based on the cookie value retrieved for a preceding storage location, and then comparing the expected and retrieved cookie values for that storage location. A score representing a level of fraud risk may be assigned to the storage location, based on the comparison. In some embodiments, the expected cookie value for each storage location after the first storage location is calculated by encrypting the cookie value retrieved for the preceding storage location in the series of storage locations, as will be described in further detail below with respect to FIG. 4.

Figure 4:
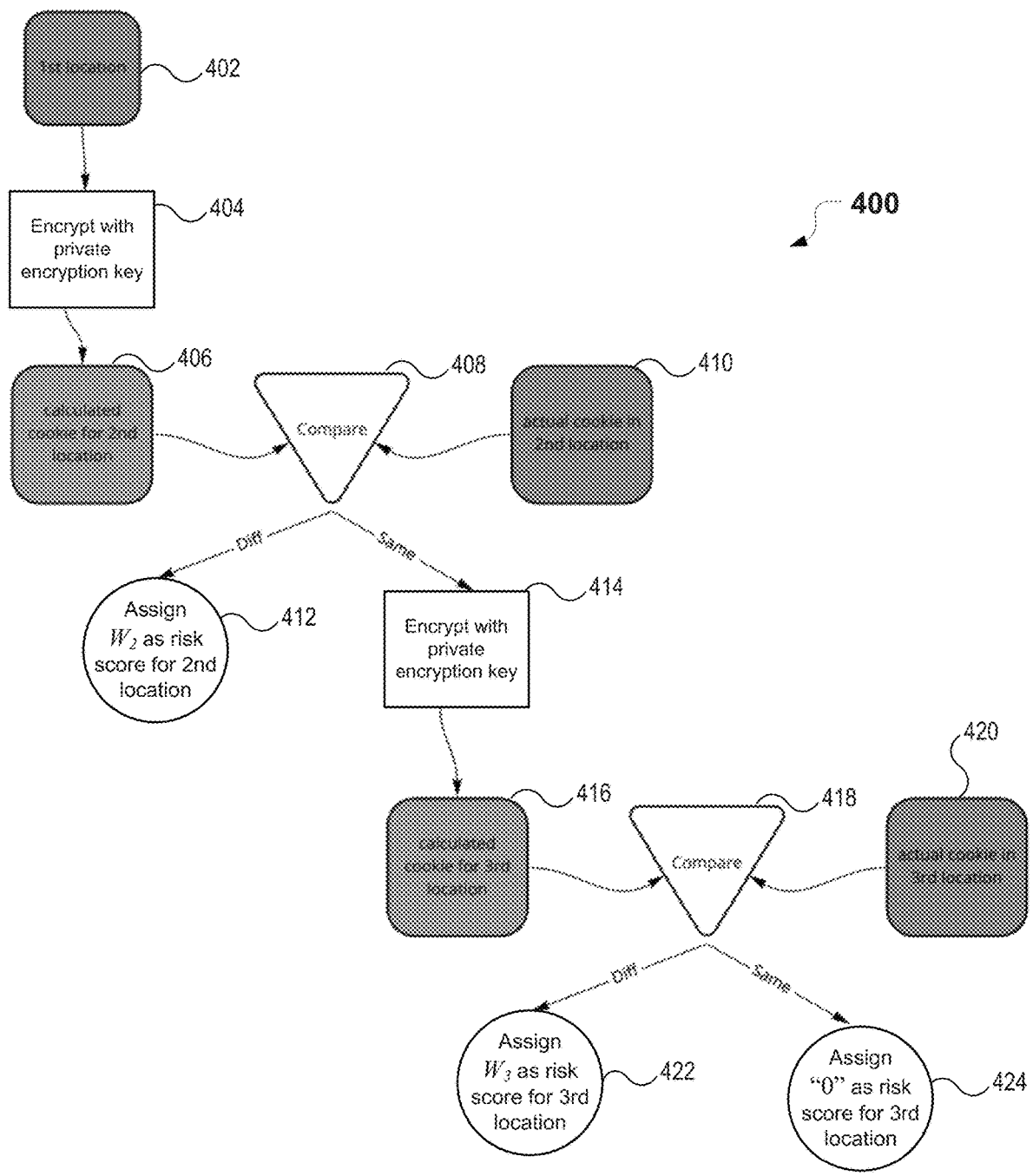
FIG. 4 is a flowchart of a cookie verification process based on a sequential encryption scheme for cookie storage locations, according to an embodiment of the present disclosure.

FIG. 4 is a flowchart of a cookie verification process 400 based on a sequential encryption scheme for a series of storage locations, e.g., the series of storage locations identified in block 304 of process 300, as described above. The sequential encryption scheme may use, for example, a private encryption key to encrypt cookie values between consecutive storage locations in the series, as will be described in further detail below. It is assumed for purposes of this example that there are a total of three storage locations available on the user's device for storing web cookies or cookie values. However, it should be appreciated that embodiments of the present disclosure are not limited thereto and that the disclosed techniques may be applied to any number of storage locations. It is also assumed that the storage locations are sorted in order of increasing fraud risk and that each storage location is associated with a weighted score (e.g., from $W_1$ to $W_3$) representing a level of fraud risk based on a position of that storage location in the ordered series of storage locations.

In some embodiments, the level of fraud risk associated with a particular storage location may be representative of the location's network accessibility, e.g., how easy, or difficult, it would be for a remote third-party to access data stored at that location over a network, relative to other locations in the series of storage locations available on the device for storing web cookies. The level of fraud risk for each storage location in the series may be, for example, a predetermined value based on historical data, expert opinion, or any other relevant source of information regarding the relative risk or likelihood of fraud or theft generally associated with that location or similar type of cookie storage location. The weighted scores corresponding to the series of storage locations may be, for example, a predetermined set of values that progressively increases from the first storage location (with the lowest level of fraud risk) to the last storage location in the series (with the highest level of fraud risk). For discussion purposes, process 400 will be described using system 200 of FIG. 2, as described above, but process 400 is not intended to be limited thereto. Like process 300 of FIG. 3, process 400 may be performed by, for example, cookie verifier 228 of service provider server 220 of FIG. 2, as described above.

As shown in FIG. 4, process 400 begins at block 402, which includes retrieving a cookie value from a first storage location (e.g., $L_1$ of cookie storage locations 214 of user device 210 of FIG. 2, as described above). If no value is present at the first storage location, the first storage location may be assigned the weighted score (e.g., $W_1$) representing the predetermined level of fraud risk for the first location, as described above. The value of the first storage location is then encrypted with a private encryption key (at 404) to thereby calculate an expected cookie value for the second storage location (at 406). In some embodiments, the private encryption key may be associated with a service provider (e.g., the service provider associated with server 220 of FIG. 2, as described above). In some embodiments, the private encryption key may be further associated with a third-party host of the website in a trust relationship with the service provider. The same private encryption key may be used to encrypt the cookie value for each storage location and thereby calculate the expected cookie value for the next location in the series of storage locations.

The expected cookie value that is calculated (at 406) for the second storage location is then compared (at 408) with an actual cookie value retrieved (at 410) from the user's device for the second storage location. The second storage location may be assigned a score (or "risk score") representing the level of fraud risk associated with the location based on the comparison. If the expected cookie value differs from the retrieved cookie value for the second storage location, the second storage location may be assigned a weighted score of $W_2$ (at 412) representing a predetermined level of fraud risk associated with the second location in the series of storage locations. The weighted score assigned to the second storage location may serve as a penalty for the mismatch between the expected and actual cookie values. However, if the expected cookie value matches the actual or retrieved cookie value for the second storage location, no penalty is incurred and the retrieved cookie value for the second storage location is encrypted with the private encryption key (at 414) to calculate an expected cookie value for the third storage location (at 416).

The expected cookie value for the third storage location is then compared (at 418) with an actual cookie value retrieved (at 420) from the user's device for the third storage location. If the expected cookie value differs from the retrieved cookie value for the third storage location, the third storage location may be assigned a weighted score of $W_3$ (at 422) that represents the predetermined level of fraud risk associated with the third location in the series of storage locations. If the expected cookie value matches the retrieved cookie value for the third storage location, the third storage location may be assigned a value of zero as the risk score (at 424).

Returning to process 300 of FIG. 3, if it is determined in block 310 that the actual cookie value retrieved from the device for each storage location matches the expected cookie value for that storage location, process 300 may proceed to block 316, in which the authentication request received at block 302 is approved and the user is allowed access to the website. However, if there is any mismatch between the actual and expected cookie values for at least one of the storage locations in the series, process 300 proceeds instead to block 312.

In block 312, a score representing a level of fraud risk for the authentication request itself is calculated. Unlike the risk score assigned to individual storage locations, as described above, the score calculated in block 312 may represent an overall level of fraud risk for the authentication request received from the user's device. Such an overall risk score may be calculated based on the individual risk scores assigned to the series of storage locations. As described above with respect to process 400 of FIG. 4, the risk score assigned to each location may be either a weighted score representing a predetermined level of fraud risk associated with that location (assigned as a penalty for a mismatch between the actual and expected cookie values for that location) or a value of zero (indicating that no penalty was incurred because there was no mismatch).

The calculated score from block 312 is then used in block 314 to process the authentication request. In some embodiments, the processing in block 314 may include determining whether the calculated score exceeds a predetermined risk tolerance for fraud detection and, when the calculated score exceeds the predetermined risk tolerance, routing the authentication request to one or more fraud detection models for further processing.

The operations described above with respect to blocks 308, 310, 312, and 314 are performed only if it is determined in block 306 that the user is not a first-time visitor (e.g., a recurring visitor with cookie values stored at the device from previous visits to the website). However, if it is determined in block 306 that the user is a first-time visitor, e.g., as indicated by the absence of a web cookie or cookie value at the first storage location, process 300 may proceed to block 318.

In block 318, the authentication request received at block 302 is processed for the user as a first-time visitor to the website. The operations for processing the authentication request in block 318 may include, for example: (1) sorting the storage locations identified in block 304 as a series of storage locations in an order of increasing fraud risk starting from a first storage location in the series of storage locations; (2) assigning a weighted score representing the level of fraud risk based on a position of that storage location in the series of storage locations as sorted above; and (3) generating a private encryption key that can be used to generate the cookie values for storage locations after the first storage location in the series. Such cookie values may be generated using, for example, a sequential encryption process, as will be described in further detail below with respect to FIG. 5.

Figure 5:
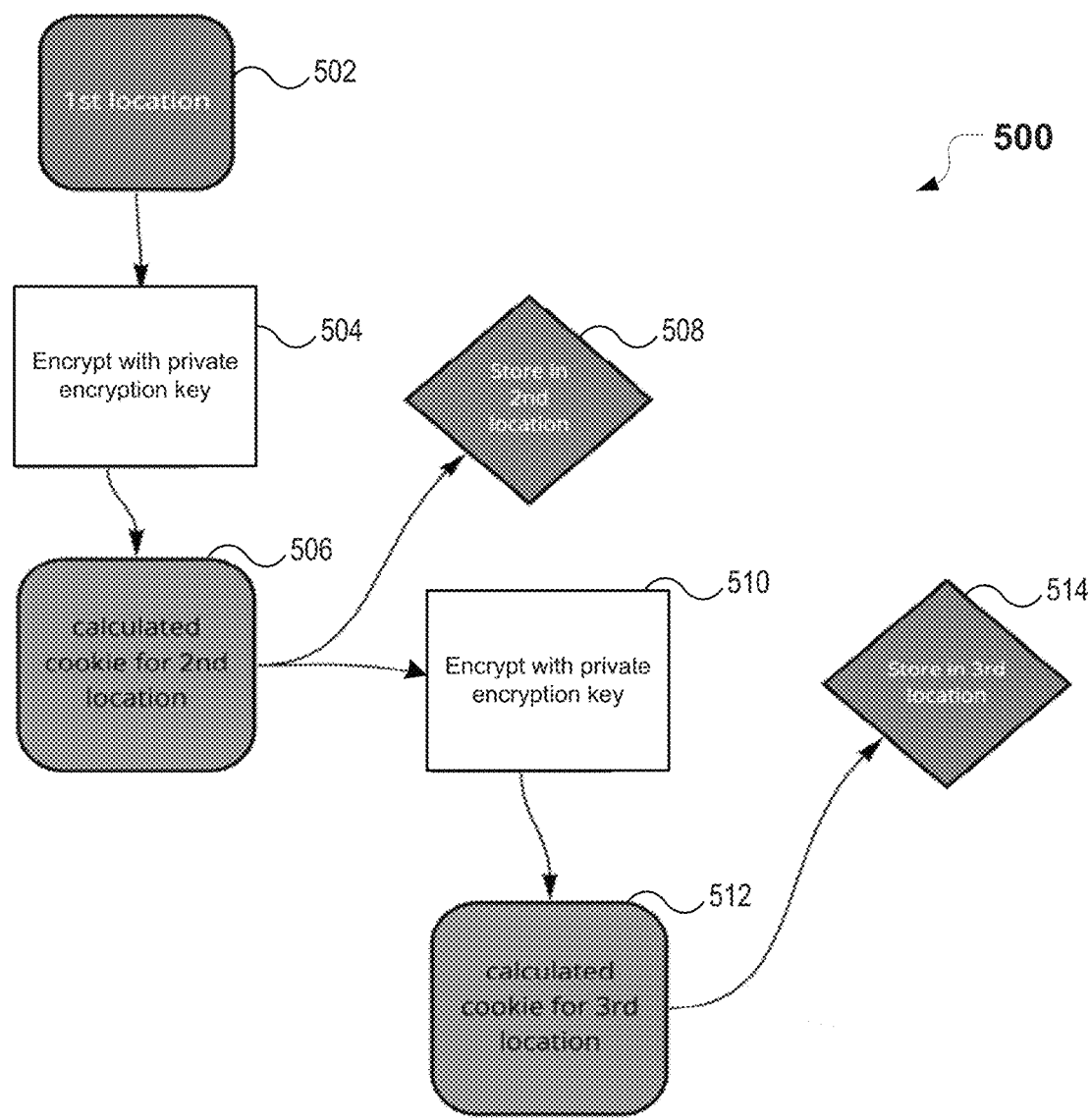
FIG. 5 is a flowchart of a sequential encryption process for initializing cookie storage locations to enable cookie verification for subsequent authentication requests or login attempts, according to an embodiment of the present disclosure.

FIG. 5 is a flowchart of a sequential encryption process 500 for initializing cookie storage locations with encrypted cookie values that can be verified (e.g., using the encryption-based cookie verification process 400 of FIG. 4, as described above) for subsequent authentication requests or login attempts received from a user's device. Process 500 may be used to configure the available cookie storage locations on the user's device, as described above. In some implementations, process 500 may also be used to set the cookie values for all storage locations to the expected values to reset the overall risk score for any subsequent authentication requests associated with future visits to the website by the same user. The cookie values and risk scores may be reset, for example, after detecting a mismatch between the actual and expected cookie values for at least one of the storage locations and the mismatch has been reported to downstream fraud detection models, e.g., associated with a transaction risk assessment system of a service provider, as described above. Like process 400 of FIG. 4, it is assumed for purposes of the example in FIG. 5 that a total of three storage locations are available on the user's device for storing web cookies or cookie values. However, it should be appreciated that embodiments of the present disclosure are not limited thereto and that the disclosed techniques may be applied to any number of storage locations. It is also assumed that the storage locations are sorted in order of increasing fraud risk.

As shown in FIG. 5, process 500 begins at block 502, which includes storing a first cookie value at the first storage location. The cookie value for the first storage location may be any value or set of values that can be used to track user activity across multiple visits to the website. In some cases, each website visit by the user may correspond to a different user session, e.g., as initiated by the user via a web browser or other suitable application executable at the user's device. In some embodiments, the first cookie value may be a unique static or dynamic identifier generated by a service provider associated with the website. The unique identifier may be based on, for example, authentication information associated with the user or user's account with the service provider (e.g., username, password, multifactor authentication data, an account identifier, a session identifier, or other user-specific data) received from the user's device. The authentication information may be input by the user via a login page of the website loaded within a web browser or other suitable application executable at the user's device. A first cookie value based on such authentication information may be used later by the service provider to facilitate user authentication and login (e.g., automated login without requiring manual user input of authentication credentials) for subsequent visits to the website. Additionally or alternatively, the first cookie value may be generated based on device-specific data (e.g., a unique hardware identifier, such as a MAC address), which may be used by the service provider as a device fingerprint to identify the device.

The first cookie value that is stored at the first storage location on the user's device may then be encrypted with a private encryption key (at 504) to thereby calculate a second cookie value for the second storage location (at 506). After the second cookie value is stored in the second storage location (at 508), it is encrypted with the private encryption key (at 510) to thereby calculate a third cookie value for the third (and last) storage location (at 512) in this example. The third cookie value is then stored in the third storage location (at 514).

The same private encryption key is used to encrypt the cookie values for the second and third storage locations (at 504 and 510, respectively). In some implementations, an asymmetric key encryption system, e.g., RSA, may be used for the private encryption key to make it more difficult for possible attackers to reverse-engineer the encryption technique and nullify the encryption process by replicating the private key on their machine. As described above, the private encryption key may be associated with the service provider (e.g., the service provider associated with server 220 of FIG. 2, as described above) or a third-party host of the website in a trust relationship with the service provider.

Figure 6:
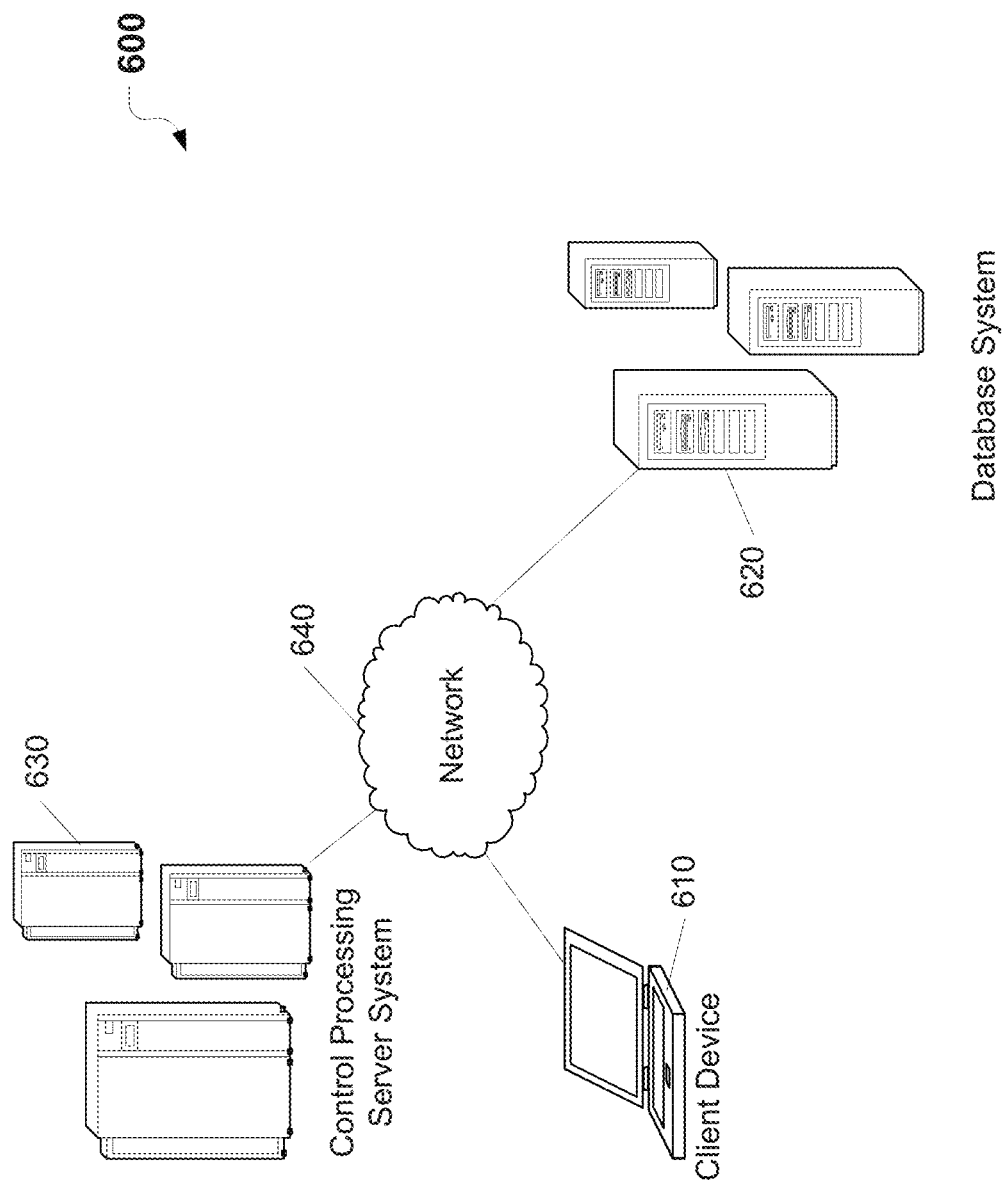
FIG. 6 is a block diagram of a distributed client-server system in which embodiments of the present disclosure may be implemented.

FIG. 6 is a block diagram of a distributed client-server system 600 in which embodiments of the present disclosure may be implemented. The system 600 may include at least one client device 610, at least one database system 620, and/or at least one server system 630 in communication via a network 640. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 6.

Client device 610 may access server applications and/or resources using one or more client applications (not shown) as described herein. Client device 610 may be a mobile device, such as a laptop, smart phone, mobile phones, or tablet, or computing devices, such as a desktop computer or a server, wearables, embedded devices. Alternatively, client device 610 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 620 may be configured to maintain, store, retrieve, and update information for server system 630. Further, database system may provide server system 630 with information periodically or upon request. In this regard, database system 620 may be a distributed database capable of storing, maintaining, and updating large volumes of data across clusters of nodes. Database system 620 may provide a variety of databases including, but not limited to, relational databases, hierarchical databases, distributed databases, in-memory databases, flat file databases, XML databases, NoSQL databases, graph databases, and/or a combination thereof.

Server system 630 may be configured with a server application (not shown) that is capable of interfacing with client application and database system 620 as described herein. In this regard, server system 630 may be a stand-alone server, a corporate server, or a server located in a server farm or cloud-computer environment. According to some examples, server system 630 may be a virtual server hosted on hardware capable of supporting a plurality of virtual servers.

Network 640 may include any type of network. For example, network 640 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 600 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 600. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 600 in front of one or more computing devices such that any external devices may communicate directly with the specialized hardware.

Figure 7:
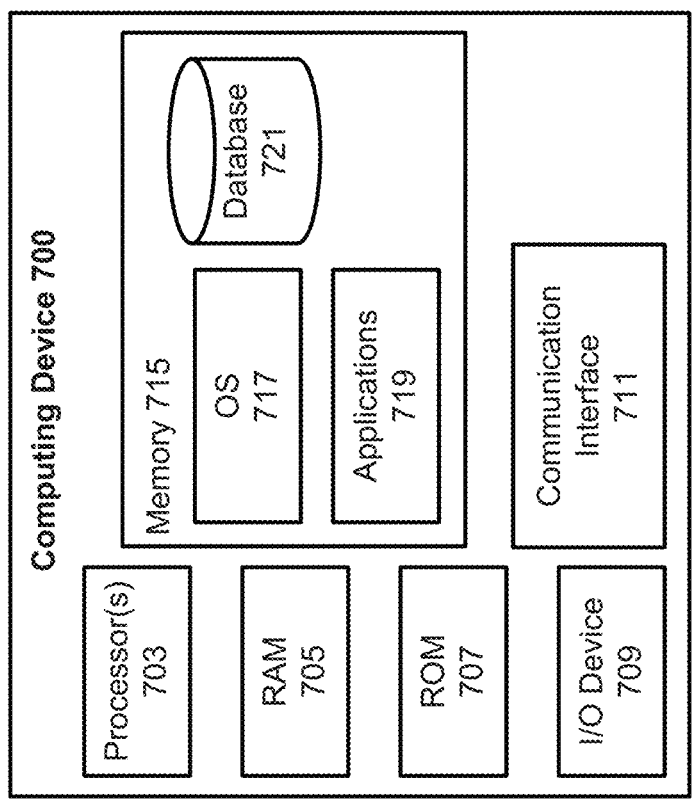
FIG. 7 is a block diagram of a computing device in which embodiments of the present disclosure may be implemented.

Turning now to FIG. 7, a computing device 700 that may be used with one or more of the computational systems is described. The computing device 700 may include a processor 703 for controlling overall operation of the computing device 700 and its associated components, including RAM 705, ROM 707, input/output (I/O) device 709, communication interface 711, and/or memory 715. A data bus may interconnect processor(s) 703, RAM 705, ROM 707, memory 715, I/O device 709, and/or communication interface 711. In some embodiments, computing device 700 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

I/O device 709 may include a microphone, keypad, touch screen, and/or stylus motion, gesture, through which a user of the computing device 700 may provide input, and may also include one or more of a speaker for providing audio output and a video display device for providing textual, audiovisual, and/or graphical output. Software may be stored within memory 715 to provide instructions to processor 703 allowing computing device 700 to perform various actions. For example, memory 715 may store software used by the computing device 700, such as an operating system 717, application programs 719, and/or an associated database 721. The various hardware memory units in memory 715 may include volatile and nonvolatile, removable and non-removable media implemented in any method or technology for storage of information such as computer-readable instructions, data structures, program modules, or other data. Memory 715 may include one or more physical persistent memory devices and/or one or more non-persistent memory devices. Memory 715 may include, but is not limited to, random access memory (RAM) 705, read only memory (ROM) 707, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 703.

Communication interface 711 may include one or more transceivers, digital signal processors, and/or additional circuitry and software for communicating via any network, wired or wireless, using any protocol as described herein.

Processor 703 may include a single central processing unit (CPU), which may be a single-core or multi-core processor, or may include multiple CPUs. Processor(s) 703 and associated components may allow the computing device 700 to execute a series of computer-readable instructions to perform some or all of the processes described herein. Although not shown in FIG. 7, various elements within memory 715 or other components in computing device 700, may include one or more caches, for example, CPU caches used by the processor 703, page caches used by the operating system 717, disk caches of a hard drive, and/or database caches used to cache content from database 721. For embodiments including a CPU cache, the CPU cache may be used by one or more processors 703 to reduce memory latency and access time. A processor 703 may retrieve data from or write data to the CPU cache rather than reading/writing to memory 715, which may improve the speed of these operations. In some examples, a database cache may be created in which certain data from a database 721 is cached in a separate smaller database in a memory separate from the database, such as in RAM 705 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 700 are described separately, functionality of the various components may be combined and/or performed by a single component and/or multiple computing devices in communication without departing from the invention as claimed.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
a non-transitory memory; and
one or more hardware processors coupled to the non-transitory memory and that read instructions from the non-transitory memory to cause the system to perform operations comprising:
receiving, via a network communication with a device of a user, an authentication request for the user to access a website using a web browser executable at the device;
responsive to the received authentication request, identifying a series of storage locations available on the device for storing web cookies, wherein the series of storage locations are sorted in order of increasing fraud risk starting from a first storage location in the series of storage locations;
retrieving, via the network from the device, a cookie value for each storage location in the series of storage locations;
for each storage location after the first storage location:
calculating an expected cookie value for the storage location, based on the cookie value retrieved for a preceding storage location in the series of storage locations;
comparing the expected cookie value for the storage location with the retrieved cookie value for the storage location; and
assigning a score representing a level of fraud risk for the storage location, based on the comparison; and
authenticating the user, based on whether the assigned score for at least one of the storage locations in the series exceeds a predetermined risk tolerance for fraud detection.

2. The system of claim 1, wherein the expected cookie value for each storage location after the first storage location is calculated by encrypting the cookie value retrieved for the preceding storage location in the series of storage locations.

3. The system of claim 2, wherein the website is associated with a service provider, and the cookie value of the preceding storage location is encrypted using a private encryption key associated with the service provider.

4. The system of claim 3, wherein the private encryption key is further associated with a third-party host of the website in a trust relationship with the service provider.

5. The system of claim 1, wherein each storage location is associated with a weighted score representing the level of fraud risk based on a position of that storage location in the series, and the weighted score associated with each storage location after the first storage location is assigned to that storage location when the comparison reveals a mismatch between the expected cookie value and the retrieved cookie value for the storage location.

6. The system of claim 1, wherein the cookie value is generated and stored at each storage location in the series of storage locations on the device in response to determining that the user is a first-time visitor of the website.

7. The system of claim 6, wherein the operations further comprise:
determining that the user has not previously visited the website when no web cookie is stored at the first storage location;
based on determining that the user has not previously visited the website, storing a first cookie value at the first storage location;
generating a second cookie value corresponding to each storage location after the first storage location by encrypting a web cookie value of the preceding storage location in the series of storage locations; and
storing the generated second cookie value at each corresponding storage location in the series of storage locations after the first storage location.

8. A method comprising:
receiving, via a network from a device of a user, an authentication request for the user to access a website using a web browser executable at the device;
responsive to the received authentication request, identifying a series of storage locations available on the device for storing web cookies, wherein the series of storage locations are sorted in order of increasing risk of fraud starting from a first storage location;
determining that the user has previously visited the website based on at least one web cookie stored at the first storage location in the series of storage locations;
retrieving, via the network from the device, a cookie value for each storage location in the series of storage locations;
determining whether the retrieved cookie value for each storage location after the first storage location in the series of storage locations matches an expected cookie value for that storage location;
calculating a score representing a level of fraud risk for the authentication request when there is a mismatch between the retrieved cookie value and the expected cookie value for at least one storage location in the series of storage locations, wherein the score is based on a position of the at least one storage location in the series of storage locations; and authenticating the user, based on the calculated score.

9. The method of claim 8, wherein processing comprises:
determining whether the calculated score exceeds a predetermined risk tolerance for fraud detection; and
when the calculated score exceeds the predetermined risk tolerance, routing the authentication request to one or more fraud detection models for processing.

10. The method of claim 8, wherein the storage locations are selected from a group consisting of: a standard Hyper-Text Transfer Protocol (HTTP) cookie storage location; an HTTP Strict Transport Security (HSTS) cookie storage location; a local shared object storage location; a browsing history of the web browser; an HTTP entity tag (ETag) storage location; an HTTP cache; and one or more Hyper-Text Markup Language 5 (HTML5) storage locations.

11. The method of claim 8, wherein the expected cookie value for each storage location after the first storage location in the series of storage locations is calculated by encrypting a value of a web cookie stored at a preceding storage location in the series of storage locations.

12. The method of claim 11, further comprising:
determining that the user has not previously visited the website when no web cookie is stored at the first storage location;
based on determining that the user has not previously visited the website, storing a first cookie value at the first storage location;
generating a second cookie value corresponding to each storage location after the first storage location by encrypting a web cookie value of the preceding storage location in the series of storage locations; and
storing the generated second cookie value at each corresponding storage location after the first storage location in the series of storage locations.

13. The method of claim 11, wherein the website is associated with a service provider, and the value of the web cookie is encrypted using a private encryption key associated with the service provider.

14. The method of claim 13, wherein the private encryption key is further associated with a third-party host of the website in a trust relationship with the service provider.

15. A non-transitory machine-readable medium having stored thereon machine-readable instructions executable to cause a machine to perform operations comprising:
receiving, via a network from a device of a user, an authentication request for the user to access a website using a web browser executable at the device;
responsive to the received authentication request, identifying storage locations available on the device for storing web cookies;
sorting the identified storage locations as a series of storage locations in an order of increasing fraud risk starting from a first storage location;
determining that the user has previously visited the website based on at least one web cookie stored at the first storage location in the series of storage locations;
retrieving, via the network from the device, a cookie value for each storage location in the series of storage locations;
determining whether the retrieved cookie value for each storage location after the first storage location in the series of storage locations matches an expected cookie value for that storage location;
calculating a score representing a level of fraud risk for the authentication request when there is a mismatch between the retrieved cookie value and the expected cookie value for at least one storage location in the series of storage locations, wherein the score is based on a position of the at least one storage location in the series of storage locations; and
authenticating the user, based on the calculated score.

16. The non-transitory machine-readable medium of claim 15, wherein the operations further comprise:
determining whether the calculated score exceeds a predetermined risk tolerance for fraud detection; and
when the calculated score exceeds the predetermined risk tolerance, routing the authentication request to one or more fraud detection models for processing.

17. The non-transitory machine-readable medium of claim 15, wherein the storage locations are selected from a group consisting of: a standard Hyper Text Transfer Protocol (HTTP) cookie storage location; an HTTP Strict Transport Security (HSTS) cookie storage location; a local shared object storage location; a browsing history of the web browser; an HTTP entity tag (ETag) storage location; an HTTP cache; and one or more Hyper Text Markup Language 5 (HTML5) storage locations.

18. The non-transitory machine-readable medium of claim 15, wherein the expected cookie value for each storage location after the first storage location in the series of storage locations is calculated by encrypting a value of a web cookie stored at a preceding storage location in the series of storage locations.

19. The non-transitory machine-readable medium of claim 18, wherein the operations further comprise:
determining that the user has not previously visited the website when no web cookie is stored at the first storage location;
based on determining that the user has not previously visited the website, storing a first cookie value at the first storage location;
generating a second cookie value corresponding to each storage location after the first storage location by encrypting a web cookie value of the preceding storage location in the series of storage locations; and
storing the generated second cookie value at each corresponding storage location after the first storage location in the series of storage locations.

20. The non-transitory machine-readable medium of claim 18, wherein the website is associated with a service provider, and the value of the web cookie is encrypted using a private encryption key associated with the service provider.

* * * * *